US009266429B2

(12) United States Patent
Tippelhofer et al.

(10) Patent No.: US 9,266,429 B2
(45) Date of Patent: Feb. 23, 2016

(54) HUMAN MACHINE INTERFACE

(71) Applicants: Volkswagen AG, Wolfsburg (DE); Audi AG, Ingolstadt (DE)

(72) Inventors: Mario Tippelhofer, San Mateo, CA (US); Heiko Maiwand, Foster City, CA (US); Jaime Camhi, Sunnyvale, CA (US); Marco Antonio Lobato Fregoso, San Francisco, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 101 days.

(21) Appl. No.: 13/790,892

(22) Filed: Mar. 8, 2013

(65) Prior Publication Data

US 2014/0253310 A1    Sep. 11, 2014

(51) Int. Cl.
*B60Q 1/00* (2006.01)
*B60K 35/00* (2006.01)
*G06F 3/0481* (2013.01)
*B60W 50/14* (2012.01)

(52) U.S. Cl.
CPC .............. *B60K 35/00* (2013.01); *G06F 3/0481* (2013.01); *B60K 2350/927* (2013.01); *B60W 2050/146* (2013.01); *B60W 2720/103* (2013.01)

(58) Field of Classification Search
CPC ................. B60W 2050/146; B60W 2720/103
USPC ............................. 340/439, 435; 701/31.4, 36
See application file for complete search history.

(56) References Cited

U.S. PATENT DOCUMENTS

| | | | |
|---|---|---|---|
| 2003/0025597 A1* | 2/2003 | Schofield | 340/435 |
| 2006/0069478 A1* | 3/2006 | Iwama | 701/36 |
| 2008/0012726 A1* | 1/2008 | Publicover | 340/932 |
| 2010/0217477 A1* | 8/2010 | Brody | 701/29 |
| 2010/0253493 A1* | 10/2010 | Szczerba et al. | 340/435 |
| 2010/0315218 A1* | 12/2010 | Cades et al. | 340/441 |
| 2013/0226622 A1* | 8/2013 | Adamson et al. | 705/4 |

* cited by examiner

*Primary Examiner* — Shirley Lu
(74) *Attorney, Agent, or Firm* — Muncy, Geissler, Olds & Lowe, P.C.

(57) ABSTRACT

A method and system provides a human machine interface configured to provide a vehicle driver with an appropriate easy to understand information to perform driving maneuvers safely. The human machine interface provides the driver with safety information for performing a driving maneuver. The human machine interface is further configured to provide a visualization of an environment of the vehicle and a color scheme configured to convey a criticality of an execution of a vehicle maneuver.

18 Claims, 6 Drawing Sheets

HUMAN MACHINE INTERFACE

BACKGROUND OF THE INVENTION

1. Field of the Invention

The present invention relates to vehicle driver assistance systems and more particularly to a method and system for assisting a vehicle driver during driving maneuvers using a human machine interface.

2. Description of the Background Art

The driving maneuver of merging onto freeways and highways in the United States is a fairly difficult and stressful task. Many decisions must be made by the driver in a relatively small time window to estimate an appropriate speed and gap between the vehicles on the road to merge safely onto a freeway or highway. Additionally, the on-ramp size in most areas is not sufficient and further reduces the time for decision making.

Even though the amount of accidents is not as high as on other road segments, the severity of incidents is proportionally higher. This is mainly caused by the difference in speeds of the merging vehicles and the highway traffic.

Another difficult factor in merging situations is the metering lights used on on-ramps to freeways and highways. Drivers must come to a complete stop directly before an upcoming merge and, therefore, the speed of the merging vehicles is even lower as compared to an unrestricted merge situation. On-ramps using metering lights often have multiple lanes, which must merge immediately after the merging lights with a relatively small time-gap, which adds another difficult factor to the merge scenario.

Current driver assistance systems inform the driver if there is a vehicle in the driver's blind spot, but do not provide recommendations or assistance to perform a specific maneuver. The conventional systems typically use visual lighting elements in the wing mirrors (mostly LED) on both sides of the vehicle, which light up if there is a vehicle detected by the radar sensors in the blind-spot area. There is currently no system, however, that detects an upcoming driving situation (e.g., on-ramp merge, lane change, etc.) automatically and supports the driver with additional assistance systems.

SUMMARY OF THE INVENTION

In view of the foregoing and other exemplary problems, drawbacks, and disadvantages of the conventional methods and structures, an exemplary feature of the method and system of the present invention is to provide a vehicle driver with an appropriate human machine interface to perform driving maneuvers safely.

In accordance with a first exemplary, non-limiting aspect of the present invention, a system includes a human machine interface, the human machine interface being configured to provide a driver of a vehicle with safety information for performing a driving maneuver. Specifically, the human machine interface is configured to provide a visualization of an environment of the vehicle and a color scheme configured to convey a criticality of an execution of a vehicle maneuver.

In accordance with a second exemplary, non-limiting aspect of the present invention, a method includes detecting an environment around a vehicle, calculating safety information for performing a driving maneuver based on the detected environment, and providing a result of said calculating to a driver of the vehicle on a human machine interface.

In accordance with a third exemplary, non-limiting aspect of the present invention, a system includes a sensor configured to detect a presence of an adjacent vehicle in an area around a vehicle, a calculating unit configured to calculate a gap between the vehicle and the adjacent vehicle required to perform a driving maneuver, and a human machine interface configured to provide a result from the calculating unit to a driver of the vehicle.

According to certain aspects of the invention, the present invention uses one or more advanced sensors (e.g., LIDAR, Radar, camera based, etc.) to detect other vehicles around the driver's vehicle. With the information from the sensors, the system calculates necessary gaps, between the vehicle and the surrounding other vehicles, to perform the merge, lane change, or other driving related maneuver. The result of the calculation is then presented to the driver in a simple and easy to assess human machine interface, which allows the driver to analyze the situation. The system further provides recommendations as to what speed is appropriate for a safe maneuver. Additionally, a GPS based sensor in combination with onboard map information activates the system automatically when approaching an upcoming maneuver so that the driver is not distracted by additional inputs and controls.

The method and system of the present invention uses advanced sensor perception, which ideally covers 360° around the vehicle, in combination with map information and GPS localization to provide the driver with an appropriate human machine interface to perform driving maneuvers safely. Current assistance systems in this context are mainly focused on warning the driver when it is unsafe or critical to perform a maneuver. They do not provide the driver with assistance or recommendations as to how he/she can get back into a "safe zone" or when it is okay to perform the intended maneuver. According to certain aspects of the invention, instead of merely telling the driver when it is not safe to merge, the present method/system assists the driver by providing recommendations as to how to get back into a safe zone and affirm the drive with assurance that is okay to perform the driving maneuver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, do not limit the present invention, and wherein.

DETAILED DESCRIPTION

Figure 1:
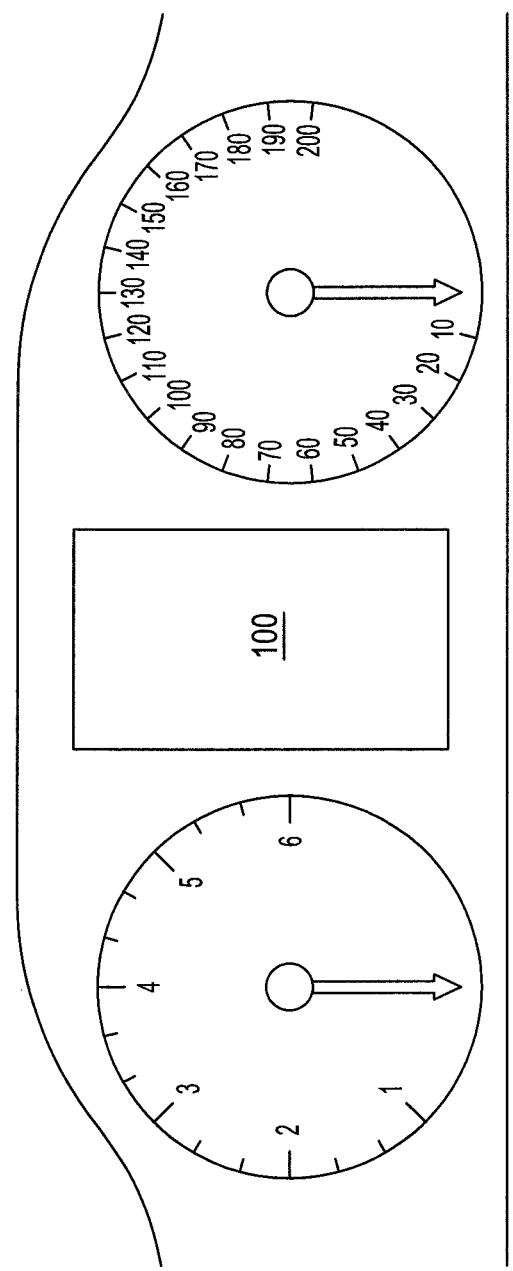
FIG. 1 illustrates an exemplary vehicle instrument cluster including a human machine interface display according to certain exemplary embodiments of the present invention.

Referring now to the drawings, and more particularly to FIGS. 1-8, there are shown exemplary embodiments of the method and structures according to the present invention.

FIGS. 1-5 illustrate varying configurations of the human machine interface. The varying configurations may be used individually or in combination. The proposed human machine interface is configured to provide the driver with an easy to understand visualization of the vehicle environment (e.g., other vehicles, map visualization, road configuration, etc.) in combination with a color scheme (e.g., green/yellow/red) to convey the criticality of the execution of the maneuver at a particular point in time as well as if performed at different vehicle speeds.

Figure 2:
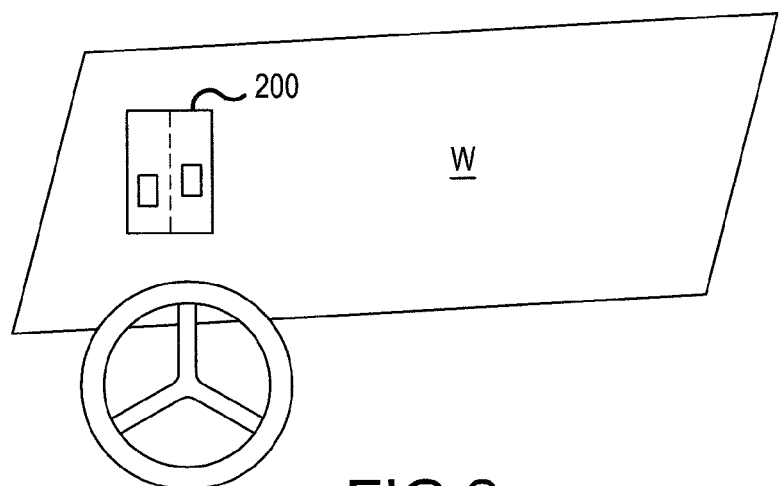
FIG. 2 illustrates an exemplary vehicle windshield heads-up display unit including a human machine interface according to certain exemplary embodiments of the present invention.
Figure 3:
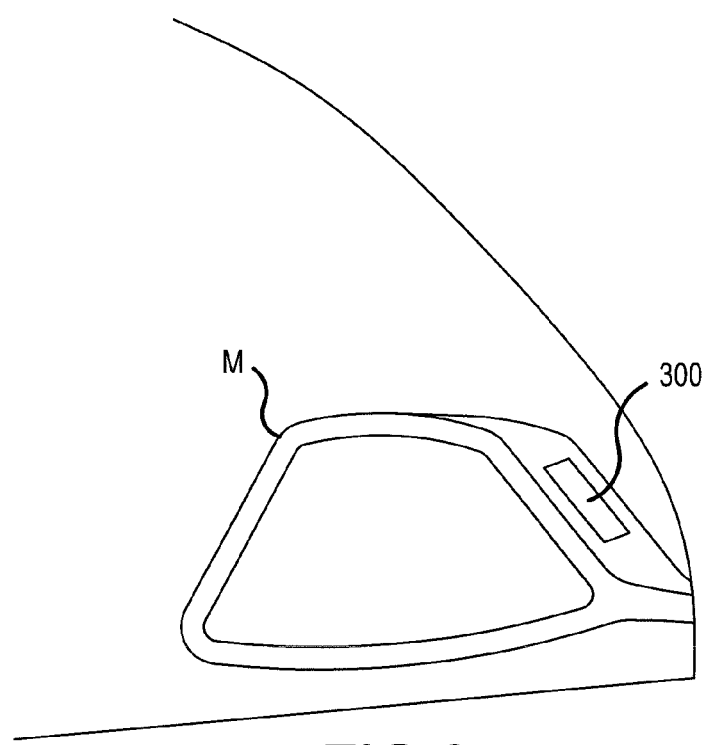
FIG. 3 illustrates a human machine interface according to certain exemplary embodiments of the present invention.

The information can be displayed to the driver in at least one and up to all three of the displays illustrated in FIG. 1-3, which are each displayed in various areas of the vehicle cockpit dependent on visual distraction impact. In addition, the information can be displayed on any combination of displays provided in the vehicle.

Figure 1A:
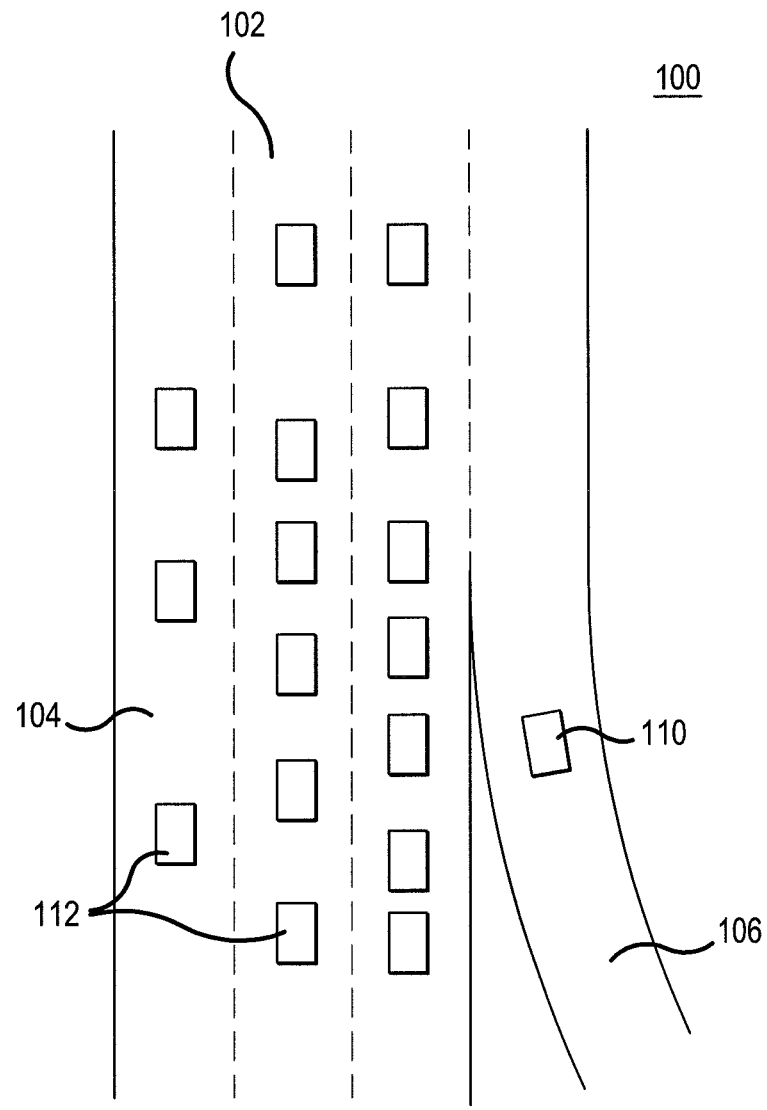
FIG. 1A illustrates a human machine interface according to certain exemplary embodiments of the present invention.

For example, detailed information including a top-view map representation and other vehicles may be provided in a display embedded, for example, within the vehicle instrument cluster adjacent the vehicle steering wheel. FIG. 1 illustrates an exemplary instrument cluster incorporating a display 100 for a human machine interface according to an exemplary embodiment of the present invention. FIG. 1A further details the map representation provided on the display 100. Indeed, the display 100 in the instrument cluster illustrates a top-view map of the road 102 (e.g., highway, freeway, etc.) including a main road portion 104 and an on-ramp 106. The position of the vehicle 110 on the on-ramp is provided on the display 100. Indeed, the recommend speed ranges (e.g., red, green, etc.) can also be visualized on the display 100 with a circular pattern next to the actual "physical" speedometer. The different speed ranges, and whether they are safe for performing the driving maneuver (e.g., merge, lane change, etc.) at the particular speed ranges, are colored and change dynamically depending on the situation. Furthermore, the position of the other vehicles 112 surrounding the vehicle 110 is displayed.

The top view of the vehicle surrounding is a fusion of map-based data and real time vehicle sensor information. The map data is geo-referenced, which means that geo-positional data (e.g., from GPS) can be displayed on the map. This visual representaiton reflects the real-world situation with minor errors and delays. The sensor information from onboard sensors are used to place the other cars on the map referenced to the ego vehicle's position. Only the vehicles that are in the range and detected by the sensors can be shown. Other vehicles behind the detected vehicles can not be visualized. Car-to-Car information in the future will help to add more more vehicles beyond the vehicle sensor range.

Figure 2A:
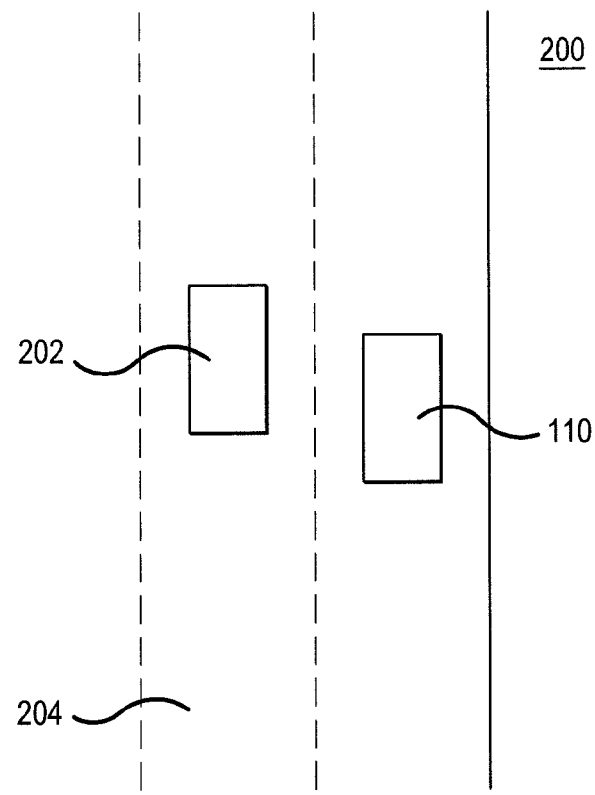
FIG. 2A illustrates a human machine interface according to certain exemplary embodiments of the present invention.

Furthermore, as is illustrated in FIG. 2, a reduced subset of information is provided in a second human machine interface 200 within a heads-up display on a vehicle windshield W. The second interface display 200, illustrated in further detail in FIG. 2A, represents the vehicle 110 and the adjacent lanes 204. Any vehicles 202 in the adjacent lanes 204 are displayed as well.

FIG. 3 illustrates a vehicle side view mirror M including a third human machine interface. Specifically, a light 300 (e.g., a LED light) is incorporated onto the side view mirror M and is configured to notify the driver whether it is safe or unsafe before performing a driving maneuver (e.g., merge, lane change, etc.).

The color scheme across all three visual elements is the same. Moreover, the color scheme is synchronized so that the driver can always rely on a fast and reliable assessment of the driving situation, which is the basis to perform the driving maneuver (e.g., lane change, merge, etc.). One example of the color scheme could be in the context of a traffic light (i.e., red/green/yellow) in which red means "don't go," green means "go," and yellow represents a state between green and red (e.g., "proceed with caution").

Figure 4:
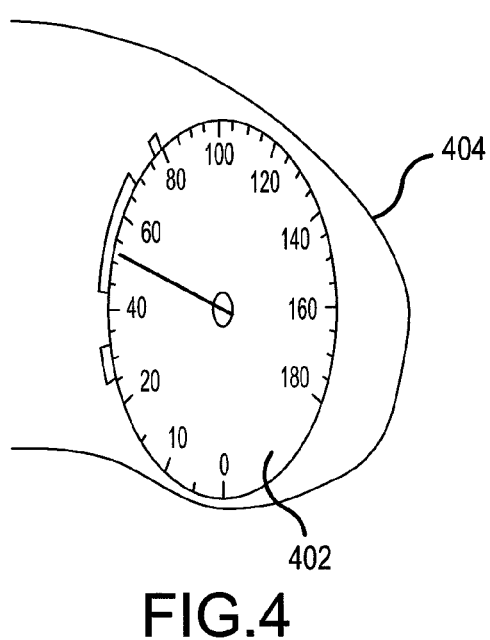
FIG. 4 illustrates a human machine interface according to certain exemplary embodiments of the present invention.

In accordance with another aspect of the invention, the system provides a speed recommendation to the user. As is illustrated in FIG. 4, the system and method of the present invention uses the display behind the speed dials in the instrument cluster to create a virtual representation of which speed ranges of the vehicle are safe to perform the driving maneuver. The speed recommendation information is derived from the speed of the vehicle as a detected speed of the vehicles by the sensor systems.

The velocity of other vehicles in the surrounding area is detected from the ego vehicle sensor readings. For example, the radar sensor allows one to extract the velocity of the detected object directly from the so called "doppler effect," which is the shift in frequency between the signal source and reflected object. Laser scanners can detect the distance between the sensor and the detected object, with the relative velocity of the ego vehicle and and the integration over a small timegap the velocity can be calculated. Car-to-Car communication can be used to further improve the accuracy and range of the detected objects.

The speed recommendation takes into account the size and position of a "driveable area" in correlation with the obstacles as well as the ego vehicle dynamics to calculate the necessary acceleration profile to match a "gap" to perform the driving maneuver (e.g., merge, lane change, etc.). The system is able to take into account the velocity and acceleration of the other vehicles to recommend the appropriate acceleration for the ego vehicle.

The speed zones can be indicated by the same color scheme (e.g., green/red/yellow) as detailed above. The speed zones are colored on the speed dial 402 in the instrument cluster 404 to indicate which speed zones/ranges are safe and which are unsafe.

The visual representation of the different speed zones provides the driver with a very easy to understand interface as to what is the appropriate action to get from a red speed zone to a "safe" green zone. The reaction of the driver in response to this information is either to keep the same speed (already in the green zone) or change speed (speed up or slow down) to move away from the red zone back into a green area.

Figure 5:
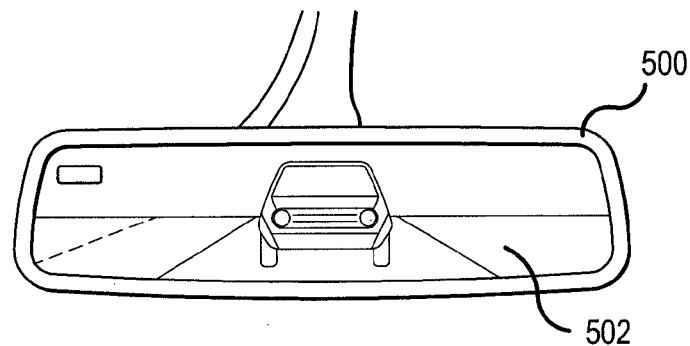
FIG. 5 illustrates a human machine interface according to certain exemplary embodiments of the present invention.

Additionally, the human machine interface can be applied to any other display or mirror within the vehicle. For example, as is illustrated in FIG. 5, the human machine interface may be incorporated into the vehicle rear view mirror.

As it may not be necessary to provide four displays with driving maneuver assistance information, the system includes an algorithm that decides, based on a profile of the driver, where to present the driving maneuver assistance information, based on the driver's historic driving behavior. The system can be programmed to learn the driver's head pose and eye gaze (based on driver monitoring with interior cameras) during driving (e.g., merge and lane change) maneuvers. Based on the learned order and where the driver looks during the driving maneuver.

Another approach can be to display the information in a specific order during the merge maneuver. For example, very information-rich information can be shown in the instrument cluster when approaching the merge situation and the driver has more time to assess the situation. As the driver gets closer to actual merge, this information can be faded out and focus on the HUD graphics with less and more driving related information. At the end right before the merge can be performed, the LED strip in the mirror can give a very concise recommendation whether it is safe or unsafe to perform the maneuver.

Figure 6:
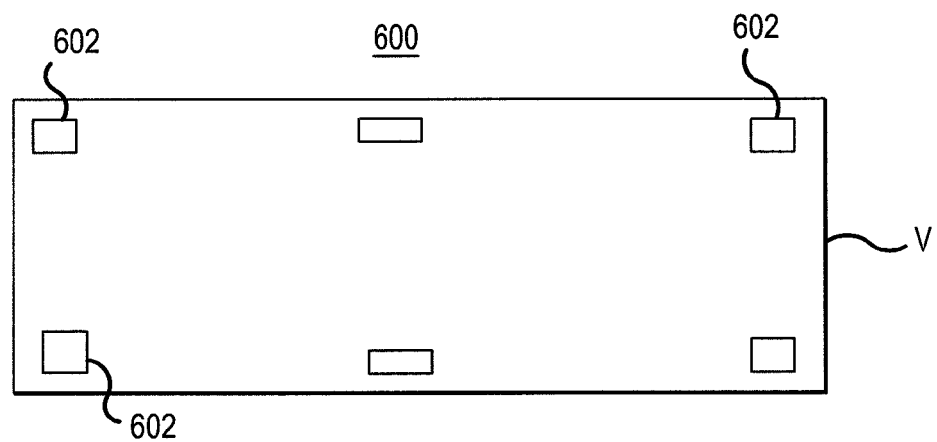
FIG. 6 illustrates a sensor configuration for a vehicle according to certain exemplary embodiments of the present invention.

FIG. 6 illustrates a sensor configuration 600 for a vehicle according to certain exemplary embodiments of the present invention. As is illustrated in FIG. 6, one or more sensors 602 are positioned around the vehicle V. In the exemplary illustration in FIG. 6, a plurality of sensors 602 are positioned along the front, rear and sides of the vehicle V. However, any suitable number or configuration of sensors may be used to detect the environment surrounding the vehicle V. The sensors 602 may include any advanced sensor type including, but not limited to, LIDAR, radar, camera-based, GPS-based, etc. Furthermore, the sensor configuration may employ a combination of a variety of types of sensors.

The necessary sensor set for a good 360 degree surround understanding can be, for example, two lidars/laser scanners (one for the front and rear) as well as two radar sensors on either side of the car to cover the neighbouring lanes on the sides. Alternatively, four laser scanners can be placed on each corner of the vehicle.

Using a GPS-based sensor, the system is able to detect the need for an upcoming driving maneuver and automatically initiate the human machine interface system.

Figure 7:
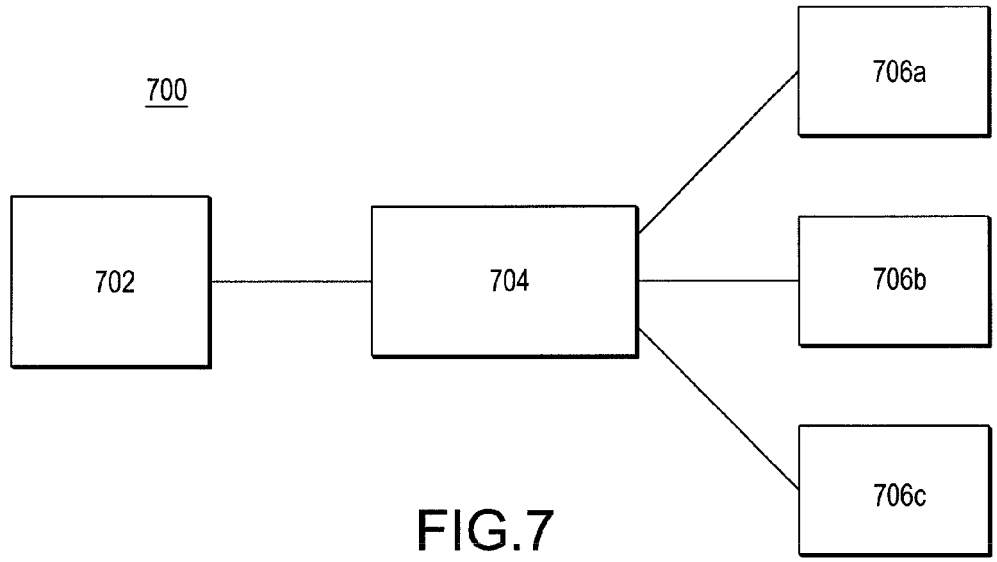
FIG. 7 illustrates a system block diagram according to certain exemplary embodiments of the present invention.

FIG. 7 illustrates a block diagram of an overall system according to an exemplary embodiment of the invention. The system includes a sensor configuration 702, including one or more sensors, for detecting information regarding the environment surrounding a vehicle. The information can relate to road conditions, road configuration, adjacent vehicle location and speed, etc. The information from the sensor configuration 702 is transmitted to a computing unit 704 configured to calculate a gap between the vehicle and the adjacent vehicle required to perform a driving maneuver. Additionally, the computing unit 704 is configured to calculate safe and unsafe vehicle speed ranges for performing the vehicle. The results from the computing unit 704 are transmitted to each component of the human machine interface 706a-c, where the results are displayed to the driver of the vehicle as detailed above.

Figure 8:
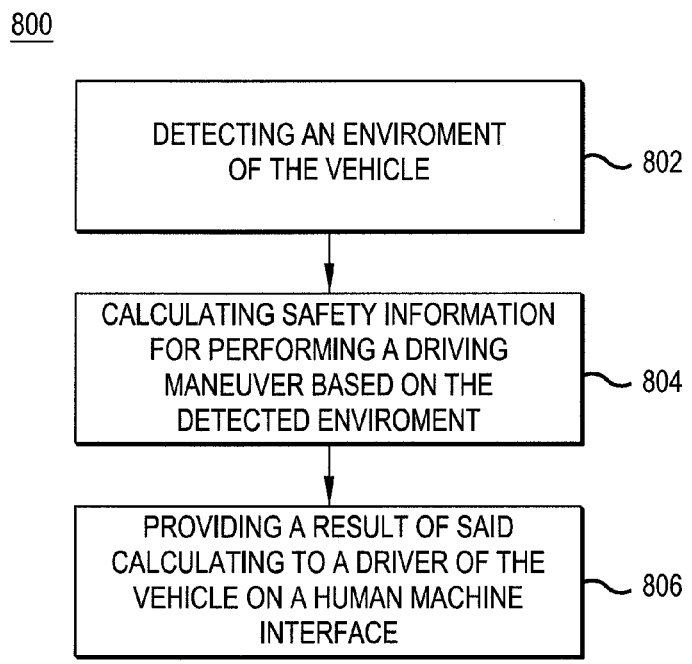
FIG. 8 illustrates a method flow chart according to certain exemplary embodiments of the present invention.

FIG. 8 illustrates a method flow chart according to certain exemplary embodiments of the present invention. The method 800 includes detecting 802 an environment of the vehicle, which may include, for example, a presence of an adjacent vehicle in an area around a vehicle or the configuration of the road or traffic on the road. Based on the detected information, safety information for performing a driving maneuver based on the detected environment is calculated 804. The safety information may include calculating a gap between the vehicle and an adjacent vehicle required to perform a driving maneuver and/or calculating a safe speed range for safely performing the driving maneuver. Then, the results of the calculating are provided 806 to a driver of the vehicle on a human machine interface.

The method (and the computing unit 704) of the invention may be implelmented in a typical computer hardware configuration, which may be incorporated into the vehicle. Additionally, a different aspect of the invention includes a computer-implemented method for performing at least certain steps in the above method. Such a method may be implemented, for example, by operating a computer, as embodied by a digital data processing apparatus, to execute a sequence of machine-readable instructions. These instructions may reside in various types of storage media. Thus, this aspect of the present invention is directed to a programmed product, including storage media (or a storage device) tangibly embodying a program of machine-readable instructions executable by a digital data processor to perform the above method.

This storage media may include, for example, a RAM contained within the CPU, as represented by the fast-access storage for example. Alternatively, the instructions may be contained in another storage media, such as a magnetic data storage diskette, compact disc, or other removable storage media/device, directly or indirectly accessible by the CPU.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system, comprising:
a human machine interface, the human machine interface configured to provide a driver of a vehicle with safety information for performing a driving maneuver, the driving maneuver comprising a merge or a lane change,
wherein the human machine interface comprises a speed recommendation display, configured to display safe speed ranges and unsafe speed ranges for performing the driving maneuver, and
wherein the human machine interface provides information with different levels of detail regarding information of the execution of the driving maneuver on a plurality of visual elements in the vehicle.

2. The system according to claim 1, wherein the human machine interface is configured to provide the driver of the vehicle with:
a visualization of an environment of the vehicle; and
a color scheme configured to convey a criticality of an execution of the vehicle maneuver.

3. The system according to claim 2, wherein the color scheme is the same on each of the plurality of visual elements.

4. The system according to claim 2, wherein the color scheme comprises a green component indicating that it is safe to perform the driving maneuver, a red component indicating that it is not safe to perform the driving maneuver, and yellow component indicating a degree of safety between the red component and the green component.

5. The system according to claim 1, wherein the human machine interface comprises a map representation of the vehicle and an environment surrounding the vehicle, the map representation being displayed within a vehicle instrument cluster.

6. The system according to claim 1, wherein the human machine interface comprises a display of the vehicle and a lane adjacent to the vehicle, the display being shown in a heads-up display of the vehicle.

7. The system according to claim 1, wherein the human machine interface comprises a light on a side view mirror of the vehicle.

8. The system according to claim 1, wherein the human machine interface comprises:
- a first visual element displaying a map representation of the vehicle and an environment surrounding the vehicle, the first visual element being disposed within a vehicle instrument cluster;
- a second visual element displaying the vehicle and a lane adjacent to the vehicle, the second visual element being displayed in a heads-up display of the vehicle; and
- a third visual element comprising a light on a side view mirror of the vehicle.

9. The system according to claim 1, wherein the speed recommendation display utilizes a color scheme to display the safe speed ranges and the unsafe speed ranges.

10. The system according to claim 1, wherein the speed recommendation display is incorporated into a speed dial of the vehicle.

11. A vehicle, comprising the system according to claim 1.

12. A method, comprising:
- detecting an environment around a vehicle;
- calculating safety information for performing a driving maneuver based on the detected environment, the driving maneuver comprising a merge or a lane change; and
- providing a result of said calculating to a driver of the vehicle on a human machine interface,
- wherein said safety information comprises a speed recommendation including safe speed ranges and unsafe speed ranges for performing the driving maneuver, and
- wherein the safety information is provided with different levels of detail regarding information of the execution of the driving maneuver on a plurality of visual elements in the vehicle.

13. The method according to claim 12, wherein said detecting an environment around the vehicle comprises detecting a presence of an adjacent vehicle in an area around a vehicle.

14. The method according to claim 12, wherein said calculating safety information comprises calculating a gap between the vehicle and an adjacent vehicle required to perform the driving maneuver.

15. The method according to claim 12, wherein the recommended speed comprises a plurality of speed ranges, the speed ranges being visualized with different colors,
- wherein the visualization of the speed ranges changes dynamically based on a driving situation.

16. A computer-readable storage medium tangibly embodying a program of machine-readable instructions executable by a digital processing apparatus to perform the method of claim 12.

17. A system, comprising:
- a sensor configured to detect a presence of an adjacent vehicle in an area around a vehicle;
- a calculating unit configured to calculate a gap between the vehicle and the adjacent vehicle required to perform a driving maneuver, the driving maneuver comprising a merge or a lane change; and
- a human machine interface configured to provide a result from the calculating unit to a driver of the vehicle,
- wherein the human machine interface comprises a speed recommendation display, configured to display safe speed ranges and unsafe speed ranges for performing the driving maneuver, and
- wherein the human machine interface provides information with different levels of detail regarding information of the execution of the driving maneuver on a plurality of visual elements in the vehicle.

18. The system according to claim 17, wherein the sensor comprises a GPS-based sensor and the system is automatically activated when an upcoming driving maneuver is detected.

* * * * *